(12) United States Patent
Hendron

(10) Patent No.: US 11,062,511 B2
(45) Date of Patent: Jul. 13, 2021

(54) CONTROLLING MOBILE CONSTRUCTION EQUIPMENT FOR SUBTERRANEAN MAPPING

(71) Applicant: Deere & Company, Moline, IL (US)

(72) Inventor: Scott S. Hendron, Dubuque, IA (US)

(73) Assignee: Deere & Company, Moline, IL (US)

( * ) Notice: Subject to any disclaimer, the term of this patent is extended or adjusted under 35 U.S.C. 154(b) by 61 days.

(21) Appl. No.: 16/401,517

(22) Filed: May 2, 2019

(65) Prior Publication Data

US 2020/0349760 A1 Nov. 5, 2020

(51) Int. Cl.
| | |
|---|---|
| *G06T 17/05* | (2011.01) |
| *G06T 7/55* | (2017.01) |
| *G06K 9/62* | (2006.01) |
| *E02F 9/26* | (2006.01) |
| *E02F 9/24* | (2006.01) |
| *G06K 9/00* | (2006.01) |
| *E02F 9/20* | (2006.01) |

(52) U.S. Cl.
CPC ............ *G06T 17/05* (2013.01); *E02F 9/261* (2013.01); *G06K 9/628* (2013.01); *G06T 7/55* (2017.01); *G06T 2207/30181* (2013.01); *G06T 2207/30244* (2013.01)

(58) Field of Classification Search
None
See application file for complete search history.

(56) References Cited

U.S. PATENT DOCUMENTS

| | | | | |
|---|---|---|---|---|
| 6,735,888 | B2* | 5/2004 | Green | E02F 3/435 37/348 |
| 9,824,490 | B1* | 11/2017 | Cote | E02F 9/261 |
| 10,755,484 | B1* | 8/2020 | Cote | G06T 7/11 |
| 2002/0184235 | A1* | 12/2002 | Young | G01V 1/00 |
| 2008/0133128 | A1 | 6/2008 | Koch | |
| 2010/0289899 | A1* | 11/2010 | Hendron | B60R 1/00 348/148 |
| 2014/0232721 | A1* | 8/2014 | Koren | G06T 15/04 345/427 |
| 2014/0254317 | A1* | 9/2014 | Thompson | G01V 1/36 367/21 |
| 2014/0330508 | A1 | 11/2014 | Montgomery | |

(Continued)

OTHER PUBLICATIONS

Techcrunch, pp. 12 [online]. Retrieved from the Internet: <URL:https://techcrunch.com/2017/05/19/project-recreates-cities-in-rich-3d-from-images-harvested-online/>.

(Continued)

*Primary Examiner* — Michael J Cobb
(74) *Attorney, Agent, or Firm* — Joseph R. Kelly; Kelly, Holt & Christenson PLLC

(57) ABSTRACT

Images, which are captured by an image capture device on a ground disturbing work machine, and that are taken from different perspectives, and are received. A machine learned image identification model identifies items of interest in the images. A three-dimensional representation is generated based on the set of images. The three-dimensional representation identifies a depth at which the recognized items lie beneath the surface of the soil being excavated. A map request is received which identifies a location and depth for which image data is to be provided. A three-dimensional representation of the location and depth are provided in response to the request.

12 Claims, 11 Drawing Sheets

(56) References Cited

U.S. PATENT DOCUMENTS

| | | | |
|---|---|---|---|
| 2015/0348309 A1* | 12/2015 | Lin | G06T 19/00 |
| | | | 345/424 |
| 2017/0256080 A1* | 9/2017 | Gu | G06T 11/00 |
| 2017/0315227 A1* | 11/2017 | Ghazanfarpour | G01S 7/24 |
| 2018/0172820 A1* | 6/2018 | Rhead | G01S 13/888 |
| 2018/0330187 A1* | 11/2018 | Ouzounis | G06T 7/90 |
| 2019/0206068 A1* | 7/2019 | Stark | G06T 7/20 |
| 2019/0378287 A1* | 12/2019 | Hollander | G06T 7/55 |
| 2020/0082170 A1* | 3/2020 | Kwon | G06T 7/73 |
| 2020/0224526 A1* | 7/2020 | Parmeshwar | E21B 47/024 |

OTHER PUBLICATIONS

Varcity platform, pp. 2 [online], [retrieved on May 17, 2017]. Retrieved from the Internet: <URL:https://www.youtube.com/watch?v=gwj4-0ualms>.

Mapillary, pp. 6 [online], Retrieved from the Internet: <URL:https://www.mapillary.com/>.

* cited by examiner

CONTROLLING MOBILE CONSTRUCTION EQUIPMENT FOR SUBTERRANEAN MAPPING

FIELD OF THE DESCRIPTION

The present description relates to mobile work machines. More specifically, the present description relates to controlling mobile work machines for subterranean mapping.

BACKGROUND

There are many different types of mobile machines. Some such machines include mobile work machines, such as excavators, loaders, scrapers, among other equipment.

These types of machines all often perform ground disturbing operations in which the ground adjacent or under the machines is excavated, scraped, or otherwise disturbed. A number of different problems can arise in performing these types of operations. For instance, there may be items underground which will be destroyed by the ground disturbing operation. By way of example, there may be underground pipes, tiles, utilities (such as wires, fiber optic cables, etc.) buried under the ground to be disturbed. When the ground disturbing operation is performed (such as an excavation) the excavation may damage or destroy these items. Repairs can be time consuming and expensive. Similarly, where the item that is damaged is hazardous (such as a gas line), damaging the item may be dangerous for operators and equipment in the vicinity of the operation.

Similarly, in performing these types of operations, it can be beneficial to know the soil type of the ground to be excavated. By way of example, it may take larger, and more robust, equipment in order to move rocky ground, than it does to move sandy ground. Similarly, there may be additional considerations (such as drainage considerations, etc.) when excavating certain types of material, such as clay.

Some current systems attempt to address these issues. For instance, there are some systems which attempt to generate images using ground penetrating radar in order to identify subsurface items. However, these images are different to interpret and they are often inaccurate in certain types of soil, such as clay.

The discussion above is merely provided for general background information and is not intended to be used as an aid in determining the scope of the claimed subject matter.

SUMMARY

Images, which are captured by an image capture device on a ground disturbing work machine, and that are taken from different perspectives, and are received. A machine learned image identification model identifies items of interest in the images. A three-dimensional representation is generated based on the set of images. The three-dimensional representation identifies a depth at which the recognized items lie beneath the surface of the soil being excavated. A map request is received which identifies a location and depth for which image data is to be provided. A three-dimensional representation of the location and depth are provided in response to the request.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
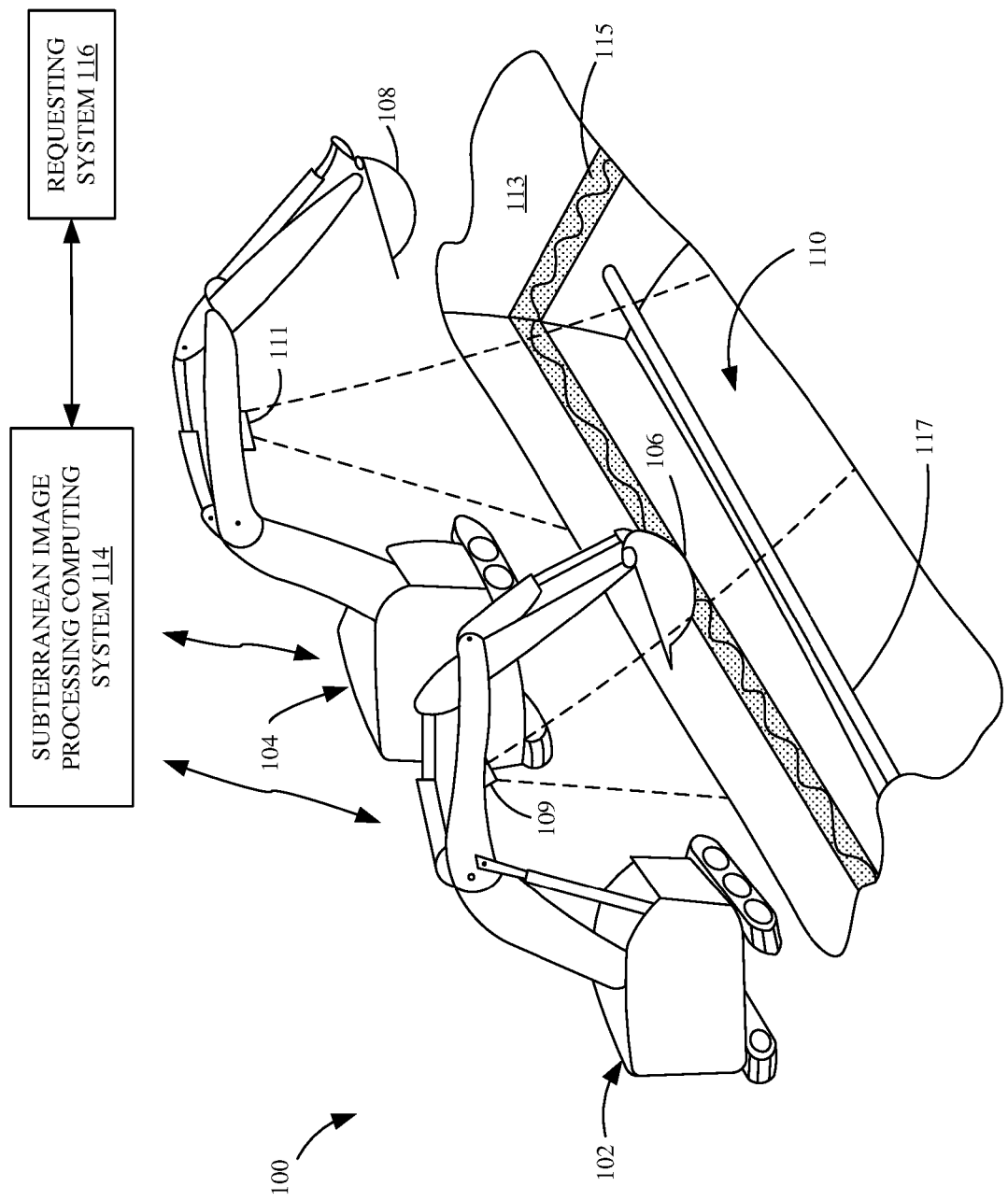
FIG. 1 is a pictorial illustration showing one example of a ground disturbing operation from which subterranean images are captured.

FIG. 1 is a pictorial illustration of one example of a worksite (or excavation site) 100 that is located at a location where a ground disturbing operation (e.g., an excavation) is being performed. It will be noted that ground disturbing operations can be performed by different types of machines, but the ground disturbing operations are referred to herein as excavation operations.

In the example shown in FIG. 1, mobile work machines (e.g., excavators) 102 and 104 each have a ground disturbing implement (such as a bucket 106-108) that is controlled by a set of actuators in order to perform an excavation operation. In the example shown in FIG. 1, the operation generates an excavation (or distributed area) 110. Operators in operator compartments of excavators 102-104 can provide operator inputs to control the actuators in order to excavate soil.

In performing the excavation, there may be subterranean objects (such as gas lines, pipes, electrical cables, fiber optic cables, etc.) 117 that will be encountered. If the operators of machines 102-104 are not aware of those items, the items can be damaged or destroyed by machines 102-104. Thus, it can be beneficial to know the location of subterranean items, and to know what those items are, before the excavation operation is performed.

It can also be beneficial to know the type of soil, or ground, that is going to be disturbed by the operation. For instance, it may take more time or require different equipment, to excavate soil that is largely clay, than to excavate soil that includes any number of large rocks. FIG. 1 shows that different soil types 113 and 115 can be seen on the sidewall of excavation 110.

Thus, in the example shown in FIG. 1, machine 102 is provided with an image capture device 109 and machine 104 is provided with an image capture device 111. Image capture devices 109 and 111 are illustratively controlled to capture images of excavation 110, over time, and from different angles. Thus, as the excavation 110 grows deeper, additional images can be captured showing items 117 that have been uncovered, in the excavation. The images also illustratively show the types of soil 113, 115 that are being excavated, among other things.

As is described below, these images are processed by an image processing system in order to generate a three-dimensional representation of the excavation 110, showing the different items 113, 115, 117 encountered, at the proper subterranean depth, below the surface of the soil being excavated.

In one example, the image processing system receives those images, along with a large variety of other images, from other machines at other excavation (or ground disturbing) sites. It can automatically identify items (such as pipes, electrical or fiber optic cables, soil types, etc.) in the images and it can generate correlations between images taken at different sites. For instance, if a certain type of pipe is identified at an excavation at a particular depth, at one location, and later that same type of pipe is identified in images taken from a second excavation, a block away, then a correlation can be drawn between those two images. The correlation may be to extrapolate between the two images, assuming that the pipe runs underground between the two locations that have been excavated. These and other correlations can be generated as well.

The images, three-dimensional representations, metadata corresponding to those images and representations, and correlations among various images, can all be stored and maintained by subterranean image processing computing system 114. Thus, a user of a requesting system 116 may request subterranean information for a particular location. System 114 can respond to that request by generating a three-dimensional representation of the subterranean space, at the requested location. It can provide that information to requesting system 116 where the three-dimensional representation can be displayed to, and interacted with, by a requesting user. The three-dimensional information will illustratively identify the soil type, and subterranean items that are located beneath the surface at the identified location, the depth where those items are located, their orientation, etc. The three-dimensional information may include a pictorial representation (or actual image of), the identified location, or it may include other items as well. This is all described in greater detail below.

Figure 2:
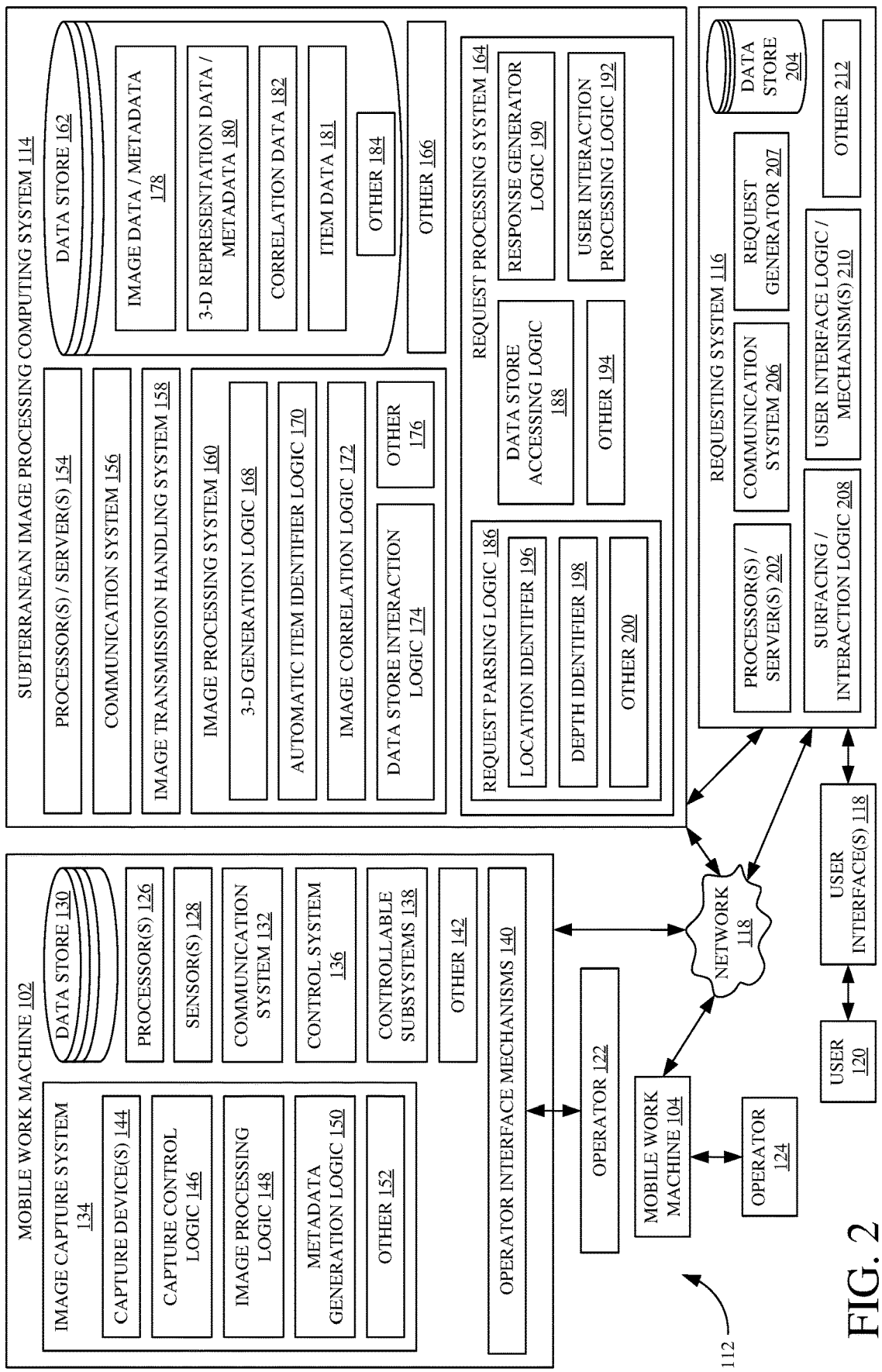
FIG. 2 is a block diagram showing one example of an architecture for generating three-dimensional mapping information from the captured images.

FIG. 2 is a block diagram showing one example of an architecture 112 that includes some items from FIG. 1. Those items are similarly numbered in FIGS. 1 and 2. FIG. 2 also shows that, in one example, machines 102-104 can communicate with one another and with subterranean image processing computing system 114 and requesting system 116, over network 118. Network 118 can thus be any of a wide variety of different types of networks, such as a wide area network, a local area network, a near field communication network, a cellular communication network, or any of a wide variety of other networks or combinations of networks.

FIG. 2 also shows that, in one example, requesting system 116 illustratively generates one or more user interfaces 118 for interaction by a requesting user 120. Requesting user 120 illustratively interacts with the user interfaces 118 in order to control and manipulate requesting system 116, and portions of subterranean image processing computing system 114.

Further, FIG. 2 shows that each of the mobile work machines 102 and 104 can include an operator 122 and 124, respectively. Operators 122 and 124 illustratively interact with operator input mechanisms to control and manipulate mobile work machines 102 and 104, respectively.

It will be noted that mobile work machines 102 and 104 can be similar, or different. For purposes of the present description, it will be assumed that they are similar, so that only mobile work machine 102 is described in more detail. Before describing the overall operation of architecture 112, in capturing images and responding to requests for subterranean 3D representation, a brief description of some of the items in architecture 112, and their operation, will first be provided.

Mobile work machine 102 illustratively includes one or more processors 126, a plurality of different sensors 128, data store 130, communication system 132, image capture system 134, control system 136, a plurality of different controllable subsystems 138, operator interface mechanisms 140, and it can include a wide variety of other items 142. Image capture system 134 illustratively includes one or more capture devices 144, capture control logic 146, image processing logic 148, metadata generation logic 150, and it can include other items 152.

Sensors 128 can sense a wide variety of different variables. For instance, they can include a position sensor (such as a GPS receiver or other position sensor) that senses the position and orientation of machine 102 or parts of machine 102. Sensors 128 can include sensors that sense the position of the various actuators that move the digging implement (e.g., bucket, scraper blade, etc.) on machine 102. They can include sensors that sense machine operation characteristics, such as ground speed, the load being carried by the machine, engine speed, engine parameters, fuel usage, fuel level, among a wide variety of other sensors.

Communication system 132 illustratively allows the items in machine 102 to communicate with one another, and to communicate over network 118. Therefore, system 132 can include a controller area network (CAN) communication system, and any other systems that can be used to communicate over network 118.

Control system 136 illustratively generates control signals to control various controllable subsystems 138. The controllable subsystems 138 can include steering and propulsion systems, for steering and driving mobile work machine 102, actuators that control the position of the digging implement, and a wide variety of other items. Control system 136 can generate the control signals based on sensor signal inputs from sensors 128, operator inputs from operator interface mechanisms 140, outputs from image capture system 134, and other items.

Operator interface mechanisms 140 can include a wide variety of different types of mechanisms that operator 122 can interact with in order to control and manipulate mobile work machine 102. For instance, they can include levers, pedals, a steering wheel, joysticks, linkages, valves, a touch sensitive screen that senses touch gestures from operator 122, a speech processing system that receives and processes speech commands from operator 122, among a wide variety of other items. Mechanisms 140 can also include visual, haptic, and audio output mechanisms that provide information to operator 122. These and other operator interface mechanisms 140 are contemplated herein.

Image capture system 134 illustratively captures the images described above with respect to FIG. 1. Therefore, capture device 144 can include one or more cameras, stereo cameras, video cameras, or other image capture devices. The images can be in the visual spectrum, the infrared spectrum, or other electromagnetic radiation spectra.

Capture control logic 146 illustratively controls capture devices 144 to capture images. Capture control logic 146 can identify an image capture trigger and then control image capture devices 144 to capture images. For instance, capture control logic 146 can sense when the actuators in controllable subsystems 138 are being operated to perform a ground disturbing operation (such as when a bucket is performing a dig operation, when a scraper is lowered, etc.). In response, it can control capture devices 144 to capture images intermittently, when they are located at different angles relative to the soil being disturbed, or in other ways. The series of images captured by image capture devices 144 are provided to image processing logic 148 which can process those images to perform identification operations to identify items in the images, or to perform preliminary image processing, where a bulk (or all) of the image processing is performed by subterranean image processing computing system 114.

Metadata generation logic 150 illustratively generates metadata corresponding to the captured images. The metadata can include such things as the geographic position of the excavation where the images were captured, the time and date where the images were captured, a depth of the excavation (such as when the depth can be identified based on known dimensions of machine 102, and the relative position of the digging element relative to a remainder of machine 102, or in other ways). Metadata generation logic 150 can generate metadata in other ways as well.

Image capture system 134 can then store the images and corresponding data in data store 130, for later transmission, or it can control communication system 132 to communicate those images, and the corresponding data, to subterranean image processing computing system 114 over network 118.

In another example, operator 122 provides an appropriate input through operator interface mechanisms 140 in order to control capture devices 144 to capture images. The images can be manually or automatically captured in other ways as well.

Subterranean image processing computing system 114 illustratively includes one or more processors or servers 154, communication system 156, image transmission handling system 158, image processing system 160, data store 162, request processing system 164, and it can include other items 166. Image processing system 160 illustratively includes three-dimensional (3D) generation logic 168, automatic item identifier logic 170, image correlation logic 172, data store interaction logic 174, and it can include other items 176. Data store 162 illustratively stores image data/metadata 178, 3D representation data/metadata 180, correlation data 182, and it can include other items 184.

Request processing system 164 illustratively includes request parsing logic 186, data store accessing logic 188, response generator logic 190, user interaction processing logic 192, and it can include other items 194. Request parsing logic 186, itself, illustratively includes location identifier 196, depth identifier 198, and it can include other items 200.

Communication system 156 illustratively allows items in system 114 to communicate with one another, and to communicate either directly or over network 118, with other items in architecture 112. Image transmission handling system 158 illustratively handles the transmission of image data for the images captured by mobile work machines 102 and 104, along with the corresponding metadata and any image processing data that was performed on machines 102-104. It illustratively provides the captured images to image processing system 160. Three-dimensional generation logic 168 illustratively receives a series of images taken of a particular excavation site (or other ground disturbing site) and generates a three-dimensional representation, based upon those images. 3D generation logic 168 can thus use photogrammetry techniques, or other techniques for generating a three-dimensional representation from a series of two-dimensional images.

Automatic item identifier logic 170 is illustratively a machine trained (or human trained) identifier (such as a neural network, Bayesian network or other classifier, rules based recognizer or probabilistic model) that is trained to identify items that are often found in subterranean locations, from the series of images of the locations. For instance, it can be trained to identify pipes, different types of pipes, and other conduits. It can be trained to identify tile, electrical or fiber optic cables, sewage system items, other utility items, among other things. As it is trained, automatic item identifier logic 170 can identify the particular type of item, and the depth of its location in the excavation (or other ground disturbing operation). It can identify its orientation (such as when a pipe is identified, it can identify the size of the pipe, the material that the pipe is made of, and the orientation of longitudinal axis of the pipe).

Automatic item identifier logic 170 is also illustratively trained to identify soil types. For instance, the images of the excavation may show a sidewall of an excavation (such as the sidewall of excavation 110 shown in FIG. 1). Logic 170 may thus be trained to identify the different soil types at different depths along the sidewall of the excavation.

Image correlation logic 172 is also illustratively a machine trained item of logic or it can be a rules-based item of logic or other item of logic (such as a neural network, Bayesian network, or other rules based recognizer, classifier or probabilistic model) that identifies correlations among different images, from different sites. For instance, if a first excavation is being performed at a first location, a first set of images may be taken from that excavation. Assume that, from the first set of images, a PVC pipe with a North-South orientation is identified at eight feet below the surface, and this data may be stored. Then, at a later time, a second excavation may be performed a block away, and a second set of images of that excavation may be captured. From the second set of images, the same type of pipe (PVC) of the same size, can be identified at the same depth, with the same North-South orientation. Image correlation logic 172 may thus correlate the two images and perform an extrapolation indicating that the identified pipe runs between the first and second locations, at a depth of eight feet, in the North-South direction.

Similarly, where the first set of images taken from the first location show a layer of clay extending between 2 and 3 feet below the surface of the ground, and the images taken from the second location also show a layer of clay extending between 2 and 3 feet below the ground surface, then image correlation logic 172 may correlate the two images and extrapolate that the layer of clay extends from the first location to the second location, at a depth of 2-3 feet below the ground surface. A wide variety of other correlations can be generated as well, and those described above are described for the sake of example only.

Data store interaction logic 174 illustratively interacts with data store 162 to store the image data and metadata 178 corresponding to the series of images that was received, the three-dimensional representation data and metadata 180 corresponding to the information generated by 3D generation logic 168, the item data 181 generated by logic 170 and that identifies different items recognized in the image, correlation data 182 generated by correlation logic 172, and it can store other items 184 as well.

Request processing system 164 illustratively receives requests for three-dimensional subterranean mapping data from requesting system 116. Request parsing logic 186 parses the request to identify the particular items of information that should be returned in response the request. The request will illustratively include at least a location for which the subterranean information is requested, and may also include a depth identifier identifying a depth for which information is sought. The depth identifier may include a depth range (such as 0-10 feet below the surface, 2-3 feet below the surface, etc.). Location identifier 196 identifies the location corresponding to the request and depth identifier 198 identifies a requested depth, if any is provided.

Data store accessing logic 188 then accesses data store 182 to obtain information corresponding to the identified location and depth. Response generator logic 190 generates a response to the request, based upon the information obtained from data store 162. That information can be provided to requesting system 116 where it can be surfaced for user interaction. The user may interact with the response in a wide variety of different ways (some of which are described in greater detail below). User interaction processing logic 192 receives an indication of those user interactions and processes them. As one example, it may be that the user wishes to view information at a different depth. Therefore, the user may manipulate a user input mechanism indicating that the user wishes to view information at a greater depth below the surface. In that case, this user interaction is detected and processed by user interaction processing logic 192 to obtain the desired information so that response generator logic 190 can generate a response and provide the updated information (or the information provided in response to the user interaction) to requesting system 116.

Requesting system 116 illustratively includes one or more processors or servers 202, data store 204, communication system 206, request generator 207, surfacing/interaction logic 208, user interface logic/mechanisms 210, and it can include a wide variety of other items 212. Communication system 206 illustratively allows items in requesting system 116 to communicate with one another, and with the other items in architecture 112 either directly or over network 118, or both. Request generator 207 illustratively receives a request input from user 120 through user interfaces 118 (which may be controlled by user interface logic or mechanisms 210) for subterranean mapping data. Request generator 207 illustratively generates a request that is sent to request processing system 164 for processing, as indicated above. Surfacing/interaction logic 208 illustratively receives the response and provides information, based on the response, that can be surfaced to operator 120 by user interface logic/mechanisms 210. It also illustratively detects user interaction with the surfaced information. In one example, the surfaced information is displayed on a touch-sensitive user interface display. The information can include a variety of different user actuatable input mechanisms that can be actuated by user 120 to change the displayed information. The actuators can include such things as a depth control actuator that can be actuated by user 120 to change the subterranean depth for which information is displayed. It can include a position actuator that changes the position for which subterranean information is displayed. It can include a time actuator that shows a time lapsed view of items that are located on the display of subterranean space. By way of example, it may be that five years ago a pipe was laid at a subterranean depth at a location and three years ago fiber optic cable was laid at a different depth, but at the same location. Thus, by changing the time actuator, the user 120 may be able to identify when subterranean items were placed at the identified location, and the depths at which they were placed. These are examples only.

Figure 3:
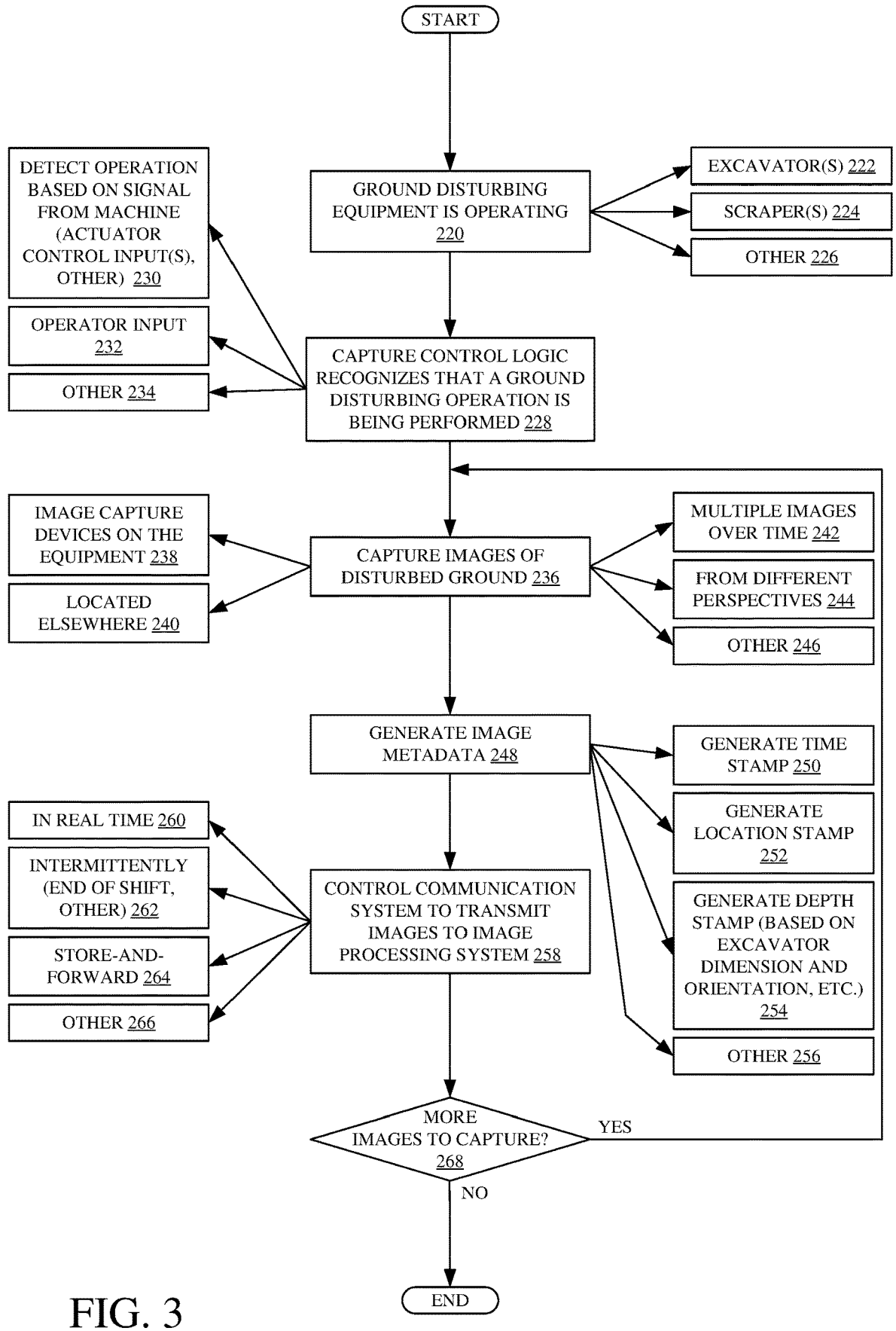
FIG. 3 is a flow diagram illustrating one example of the operation of an image capture system in capturing images used for subterranean mapping.

FIG. 3 is a flow diagram illustrating one example of the operation of image capture system 134 on mobile work machine 102 in capturing images at a location of a ground disturbing operation. The present description will proceed with respect to the ground disturbing operation being an excavation, but it will be appreciated that such a description also contemplates operations which can include a scraping operation, a loading operation, or other dirt moving or ground disturbing operations.

It is first assumed that a piece of ground disturbing equipment is operating. This is indicated by block 220 in the flow diagram of FIG. 3. Again, the ground disturbing equipment can be one or more excavators 222, scrapers 224, or a wide variety of other ground disturbing equipment that disturbs the surface of the ground to a subterranean depth for which subterranean data may be requested. This is indicated by block 226.

At some point, capture control logic 146 recognizes that a ground disturbing operation is being performed. This is indicated by block 228 in the flow diagram of FIG. 3. In one example, capture control logic 146 detects the ground disturbing operation based on a signal from the equipment or actuators on work machine 102. By way of example, it may be that one of the actuators for the ground engaging implement (e.g., the bucket) is actuated to perform a dig operation. This may be detected by capture control logic 146 as indicating that machine 102 is performing a ground disturbing operation. In another example, capture control logic 146 can receive a signal from operator interface mechanisms 140 indicating that operator 122 has provided one or more inputs to control machine 102 to perform a dig operation. These are just two examples. Detecting operation based on a signal from machine 102 is indicated by block 230 in the flow diagram of FIG. 3. Capture control logic 146 can also receive an input from operator 122 directly instructing image capture devices 144 to capture images. Controlling the image capture devices to capture an image based on an operator input is indicated by block 232.

Capture control logic 146 can determine that it is time to capture an image and control capture devices 144 to capture images in other ways as well. This is indicated by block 234.

Image capture devices 144 then capture a series of images of the disturbed ground. This is indicated by block 236. The image capture devices can be devices, such as devices 109-111 on the equipment, itself. This is indicated by block 238. The image capture devices can be located on a mobile device carried by operator 122, they can be image capture devices located in other areas as well. This is indicated by block 240 in the flow diagram of FIG. 3.

In one example, capture control logic 146 controls image capture devices 144 to capture a set of multiple images over time. This is indicated by block 242 in the flow diagram of FIG. 3. Further, capture control logic 146 can control capture devices 144 to capture images from different perspectives. This is indicated by block 244. By way of example, it may be that one of sensors 128 is an accelerometer that identifies when the machine is moving. The capture control logic 146 can control the capture devices 144 to capture a series of images as the machine is moving. This will thus provide images that are taken from different perspectives so that a three-dimensional representation can be more easily generated from them.

The capture control logic 146 can control capture devices 144 to capture images in a wide variety of other ways as well. This is indicated by block 246 in the flow diagram of FIG. 3.

Metadata generation logic 150 then generates image metadata corresponding to the series of images (and the individual images) that are captured. This is indicated by block 248 in the flow diagram of FIG. 3. For instance, it can generate a timestamp identifying the time when each image was captured. This is indicated by block 250. It can generate a location stamp indicating the geographic location where the image was captured. This is indicated by block 252. It can generate a depth stamp indicating a subterranean depth represented in the image. This is indicated by block 254. By way of example, metadata generation logic 150 may include logic that identifies the location of the ground engaging implement (e.g., the bucket) using a location sensor (such as a GPS receiver, etc.). It can also include logic that identifies the location of the bucket relative to the frame of machine 106, based upon known machine geometry and the known extent of the various actuators that are used to position the ground engaging element. In this way, it can identify a distance at which the ground engaging element is engaging the ground, below the surface of the ground on which machine 102 is sitting. This is just one way to generate a depth stamp, and it is described for the sake of example only.

Metadata generation logic 150 can also generate a wide variety of other metadata. This is indicated by block 256 in the flow diagram of FIG. 3.

Image capture system 134 can then store the image information in data store 130 and/or control communication system 132 to communicate the information to subterranean image processing computing system 114. Transmitting the images is indicated by block 258 in the flow diagram of FIG. 3. In one example, the images and the corresponding data can be transmitted in substantially real time (or near real time) as the images are captured. This is indicated by block 260. In another example, the images can be stored in data store 130 and transferred intermittently (such as at the end of a shift, the end of a day, the end of each week, or otherwise). This is indicated by block 262. In yet another example, the images can be transferred using store-and-forward mechanisms. This is indicated by block 264 and it is described in greater detail below. The images and corresponding information can be transmitted to system 114 in other ways as well. This is indicated by block 266.

In one example, machine 102 continues to take images as long as the excavation or other ground disturbing operation is performed. This is indicated by block 268 in the flow diagram of FIG. 3.

Figure 4A:
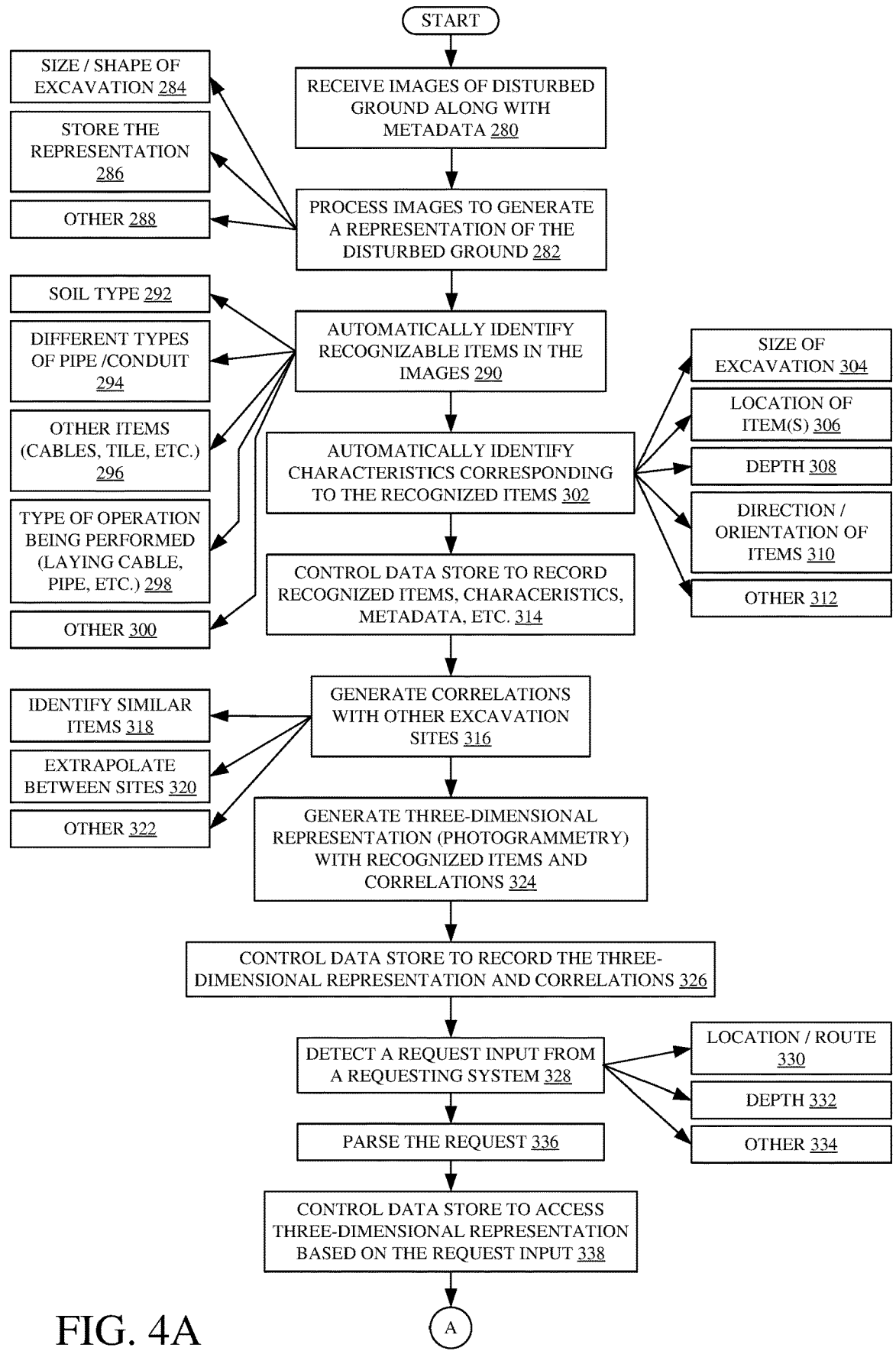
FIGS. 4A and 4B (collectively referred to herein as FIG. 4) show a flow diagram illustrating one example of the operation of a subterranean image processing computing system in processing images and responding to requests.
Figure 4B:
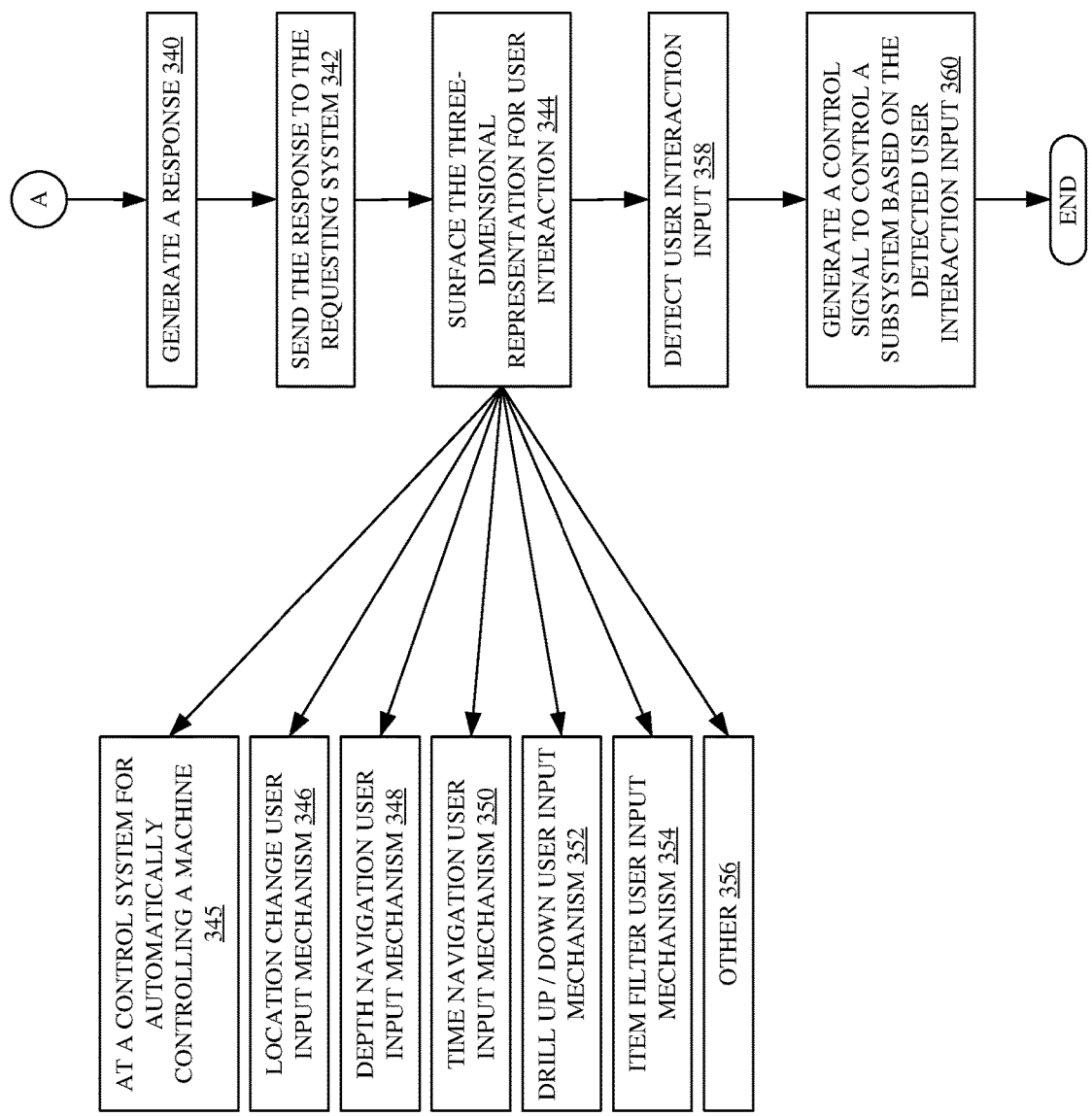

FIGS. 4A and 4B (collectively referred to herein as FIG. 4) illustrate a flow diagram showing one example of the operation of subterranean image processing computing system 114 in processing images, and in responding to requests from a requesting system 116. Image transmission handling system 158 first receives one or more images of disturbed ground along with the corresponding metadata generated by image capture system 134. Receiving the series of images is indicated by block 280 in the flow diagram of FIG. 4.

System 158 generates a representation of the images that can be processed by image processing system 160. The representation may identify the size and shape of the excavation and it can be stored in data store 162. Processing the image to generate a representation of the disturbed ground is indicated by block 282. Identifying the size and shape of the excavation is indicated by block 284 and storing that representation in the data store is indicated by block 286. The image transmission handling system 158 can generate a representation of the received images in other ways as well, and this is indicated by block 288.

Automatic item identifier logic 170 then automatically identifies recognizable items in the images, such as items that are located in the subterranean space being excavated. This is indicated by block 290. By way of example, it can identify the soil type being excavated, as indicated by block 292. It can identify different types of pipe or conduit that are located in the images, as indicated by block 294. It can identify other items, such as cable, tile, fiber optic and electrical conduits, among other things. This is indicated by block 296. It can also identify the type of operation being performed. For instance, it may be that the equipment is performing an operation to lay cable, to lay pipe, excavate a site, or another type of operation. Identifying the type of operation being performed is indicated by block 298. Other items can be identified in the images as well. This is indicated by block 300.

Automatic item identifier logic 170 can also automatically identify characteristics corresponding to those recognized items. This is indicated by block 302. For instance, it can identify the size of the portion of disturbed soil (e.g., the size of the hole forming the excavation, or other sizes). This is indicated by block 304. It can identify the location of the items within the excavation, as indicated by block 306. It can identify the depth of those items as indicated by block 308, and it can identify the direction or orientation (or pose) of the items, as indicated by block 310. It can identify a wide variety of other characteristics corresponding to the recognized items as well, and this is indicated by block 312. Also, by automatic it is meant, in one example, that the step or function or operation is performed without further human involvement except perhaps to initiate or authorize the step, function or operation.

Data store interaction logic 174 can then control data store 162 to store data indicative of the items recognized in the images, and the characteristics corresponding to those items. This is indicated by block 314. It will be noted that the original image data received by system 158, and the corresponding metadata, can be stored as well.

At some point, image correlation logic 172 illustratively generates correlations with images taken from other excavation sites. This is indicated by block 316. By way of example, image correlation logic 172 can detect that a second series of images corresponding to a different location has been received and processed. It can determine whether to generate correlations between different sets of images based on a wide variety of criteria. For instance, if the two locations are within a threshold distance of one another, that may be a trigger to identify correlations. If the two ground distributing operations are the same (or performed at the same depth), that may trigger correlation identification. These are examples only. Image correlation logic 172 can then identify similar items in the different sets of images (such as the same type of pipe at the same depth running in the same direction, etc.). It can identify the same soil types, or other similar items. This is indicated by block 318. Image correlation logic 172 can also extrapolate between images corresponding to different sites. For instance, it can extrapolate that certain soil types run between the two sites, or that certain items identified in the images run between the two sites, etc. Extrapolating between sites is indicated by block 320. It will be noted that image correlation logic 172 can generate a wide variety of other correlations as well. This is indicated by block 322.

Also, at some point, 3D generation logic 168 generates a three-dimensional representation of the excavation, with the recognized items and correlations. For instance, it can generate a three-dimensional representation of a hole being excavated, with the pipes, soil types, conduits, cables, etc., at the various subterranean depths. Generating the three-dimensional representation can be done using photogrammetry, or in a wide variety of other ways. This is indicated by block 324 in the flow diagram of FIG. 4.

Data store interaction logic 174 can control data store 162 to store this information as well as any other information, representations and correlations that are generated. This is indicated by block 326 in the flow diagram of FIG. 4.

At some point, request processing system 164 will detect a request input from a requesting system 116. This is indicated by block 328. The request may identify a geographic location for which subterranean data is requested. It may identify a single geographic locations or a route between two different locations, or a wide variety of other geographic locations including geographic location or route information in the request is indicated by block 330. The request may also include a depth identifier identifying a subterranean depth for which information is sought. The depth may be a range of depths or a single depth. Receiving a request that includes depth identifying information is indicated by block 332. The request may include a wide variety of other information as well, and this is indicated by block 334.

Request parsing logic 186 parses the request. Location identifier 196 identifies the location and depth identifier 198 identifies the depths specified in the request. Parsing the request is indicated by block 336 in the flow diagram of FIG. 4. Data store accessing logic 188 then accesses data store 162 to retrieve information requested in the request. The information can be the three-dimensional representation data along with corresponding metadata and correlation data. It can include the original image data and its metadata as well. Accessing the data store to obtain the responsive data is indicated by block 338 in the flow diagram of FIG. 4.

Once the responsive data is obtained, response generator logic 190 then generates a response. This is indicated by block 340 in the flow diagram of FIG. 4.

Response generator logic 190 then controls communication system 156 to send the response to the requesting system 116. Sending the response is indicated by block 342 in the flow diagram of FIG. 4

Surfacing/interaction logic 208 then surfaces the three-dimensional representation on a user interface 118 for user interaction by the requesting user 120. This is indicated by block 344 in the flow diagram of FIG. 4. In another example, requesting system 116 can be on machine 102 or 104. In that case, logic 208 can surface the three-dimensional representation for a control system 136 which uses it to control actuators to excavate the site but to avoid contact with any vulnerable items (items such as pipe, cables, etc. that may be damaged by the digging implement). Control system 136 uses the three-dimensional representation as a subterranean map for automatically navigating the excavation to avoid damaging items. This is indicated by block 345.

In another example, the three-dimensional representation is surfaced for user 120 and shows a view of the subterranean ground at the location specified in the request. If a specific depth was specified, it can show a three-dimensional view of items located at that depth. The three-dimensional view can show not only items (such as pipes, cables, etc.), but it can also show soil type (in layers or otherwise) at the three-dimensional, subterranean depth indicated, or throughout a range of subterranean depths. It can show this information, in three dimensions, not only at the specified location, but at a range around the specified location (such as at a 10-meter range around the specified location, or another range). All of these and other three-dimensional representations are contemplated herein.

In one example, the user interface 118 that surfaces the information includes a set of user-actuatable input mechanisms that the user can actuate to interact with the information. For instance, it can include a location change user input mechanism, as indicated by block 346. When the user actuates this, the user can change the location for which the three-dimensional representation is provided. The user interface can include a depth navigation user input mechanism 348. The user can actuate this mechanism in order to navigate the depth for which the three-dimensional representation is displayed. The user interface can include a time navigation user input mechanism 350 that can be actuated by the user to navigate through time, so that the three-dimensional representation shows items that were in the ground, at a particular time. As the user navigates forward and backward in time, additional items may be shown, if they were added or removed at different times.

The user interface can include a drill up and/or drill down user input mechanism 352. The user can actuate this actuator to show more detailed information (when drilling down) or to show less detailed, more general information in the three-dimensional representation (when drilling up). The user interface can include an item filter user input mechanism 354 that can be actuated by the user in order to filter the various items that are to be displayed. For instance, the user can filter the representation to show only fiber optic cables, only pipes, only utility items, etc. The user interface that is used to surface the representation can include a wide variety of other items 356 as well.

The user interface logic 210 can detect user interactions with the user interface 118, and those user interactions can be sent back to user interaction processing logic 192 in request processing system 164. Detecting the user interaction inputs is indicated by block 358 in the flow diagram of FIG. 4. User interaction processing logic 192 can then generate a control signal to control a subsystem in subterranean image processing computing system 114, based upon the detected user interaction. This is indicated by block 360. For instance, the user interaction processing logic 192 can generate a control signal to control data store 162 to access different information, and can then generate a control signal to control communication system 156 to communicate that information to the requesting system 116. These and other control signals can be generated based on the user interaction.

Figure 5:
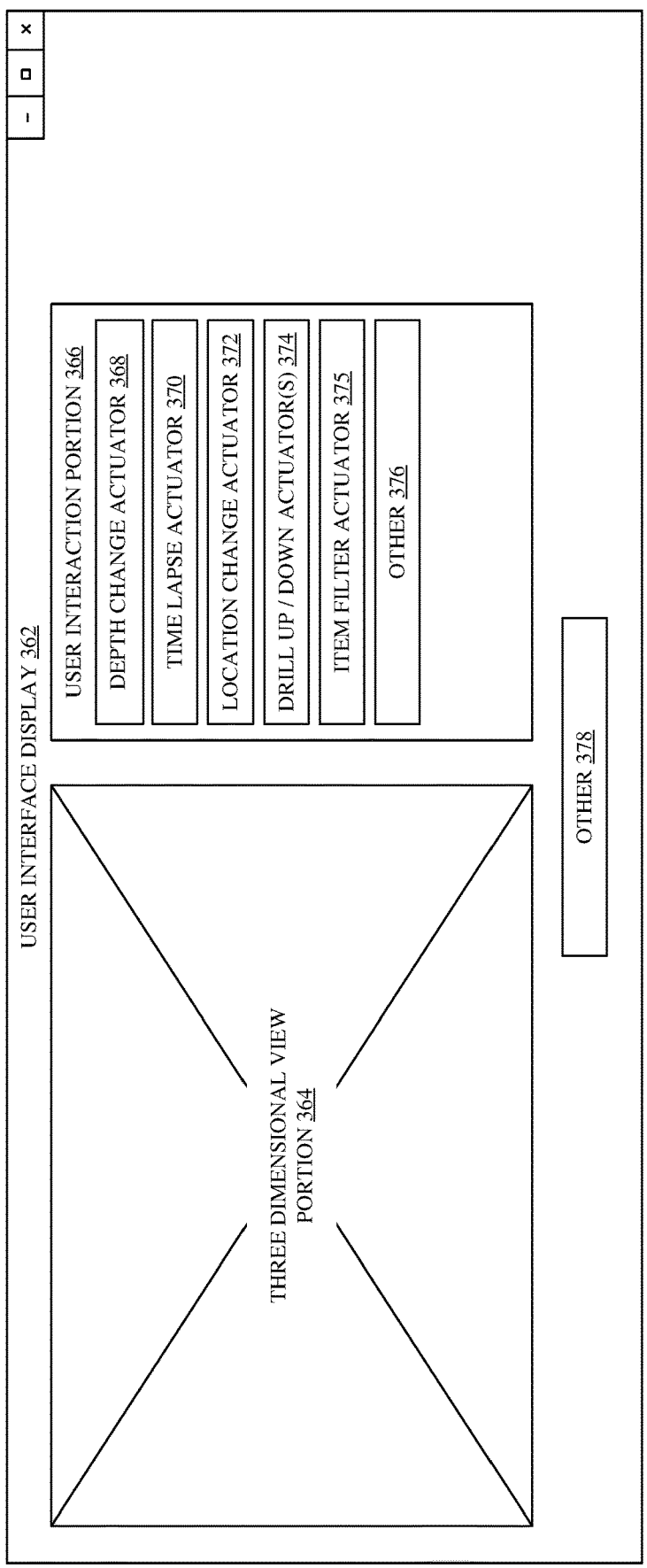
FIG. 5 is a block diagram showing one example of a user interface display that can be generated based on a request.

FIG. 5 is a block diagram showing one example of a particular user interface display 362 that can be generated by user surfacing/interaction logic 208, when requesting system 116 receives a response to a request generated by request generator 207. User interface display 362 illustratively includes three-dimensional view portion 364 that is used to display the three-dimensional representation of the ground specified by the request. The three-dimensional view can show, for instance, a three-dimensional view with a portion of the ground cut away, or a three-dimensional view from above ground looking downward, through a transparent representation of the ground, or looking from a different perspective. It can show all of the items identified at that location (such as the cables, pipes, etc.), placed at their respective locations at a corresponding subterranean depth within the three-dimensional representation. The three-dimensional view portion can show the three-dimensional representation in a wide variety of other ways as well.

In the example shown in FIG. 5, display 362 also includes user interaction portion 366. User interaction portion 366 can include a variety of user interactive actuators to interact with the display. It will be noted that the actuators can be located anywhere on display 362, as can the three-dimensional view portion 364. The two portions can overlap one another so that the actuators are displayed on the three-dimensional view, or otherwise. They are shown in a side-by-side relationship in FIG. 5 for the sake of example only.

In the example shown in FIG. 5, user interaction portion 366 includes a depth change actuator 368, a time lapse actuator 370, location change actuator 372, drill up/down actuators 374, an item filter actuator 375 and they can include a wide variety of other actuators 376. The actuators 368-376 can operate in a similar fashion to the actuators 346-356 discussed above.

It will be noted that user interface display 362 can include a wide variety of other items 378 as well.

It can thus be seen that, over time, as image capture devices capture subterranean images during various excavations or other ground disturbing operations, a detailed three-dimensional subterranean map can be generated. Even in locations where no images have been captured, correlations can be drawn between other locations that will give an indication as to what is located at those locations as well, and a three-dimensional representation of those locations (the previously un-excavated locations) can also be generated and surfaced.

The present discussion has mentioned processors and servers. In one example, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the FIGS show a number of blocks with functionality ascribed to each block. It will be noted that fewer blocks can be used so the functionality is performed by fewer components. Also, more blocks can be used with the functionality distributed among more components.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

Figure 6:
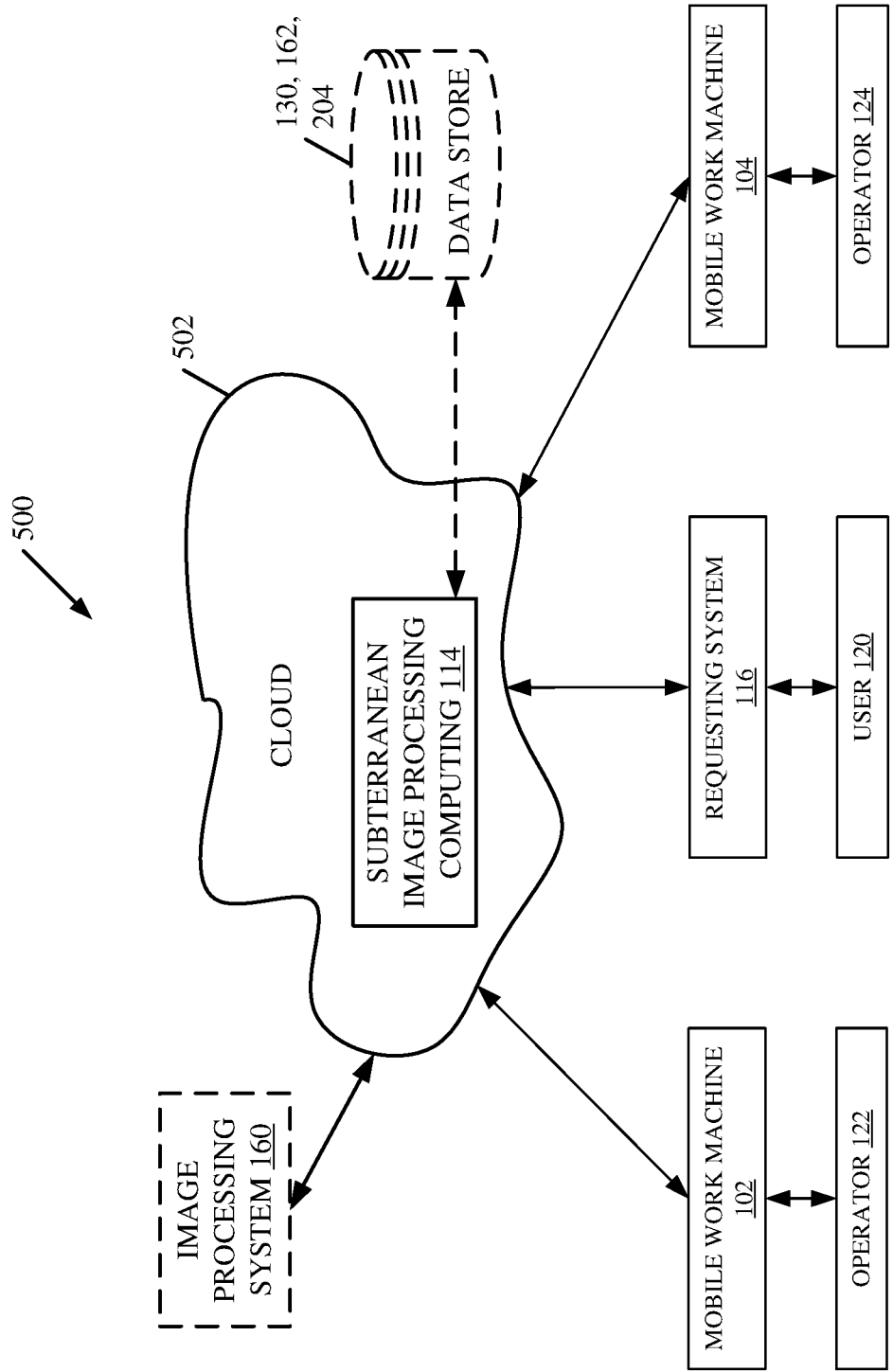
FIG. 6 is a block diagram showing one example of the architecture illustrated in FIG. 2, deployed in a remote server architecture.

FIG. 6 is a block diagram of machines 102 and 104, shown in FIG. 1, except that they communicate with elements in a remote server architecture 500. In an example, remote server architecture 500 can provide computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and they can be accessed through a web browser or any other computing component. Software or components shown in FIG. 2 as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the example shown in FIG. 6, some items are similar to those shown in FIGS. 1 and 2 and they are similarly numbered. FIG. 6 specifically shows that computing system 114, machines 102, 104 and system 116 can be located at a remote server location 502. Therefore, harvester 100 accesses those systems through remote server location 502.

FIG. 6 also depicts another example of a remote server architecture. FIG. 6 shows that it is also contemplated that some elements of FIGS. 1 and 2 are disposed at remote server location 502 while others are not. By way of example, data store 130, 162, 204 or image processing system 160 can be disposed at a location separate from location 502, and accessed through the remote server at location 502. Regardless of where they are located, they can be accessed directly by the other systems, through a network (either a wide area network or a local area network), they can be hosted at a remote site by a service, or they can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an example, where cell coverage is poor or nonexistent, another mobile machine (such as a fuel truck) can have an automated information collection system. As the machines 102, 104 come close to the fuel truck (or vice versa) for fueling, the system automatically collects the information from the machines 102, 104 using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein. Further, the information can be stored on the machines 102, 104 until the machines enter a covered location. The machines, themselves, can then send the information to the main network.

It will also be noted that the elements of FIGS. 1 and 2, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 7:
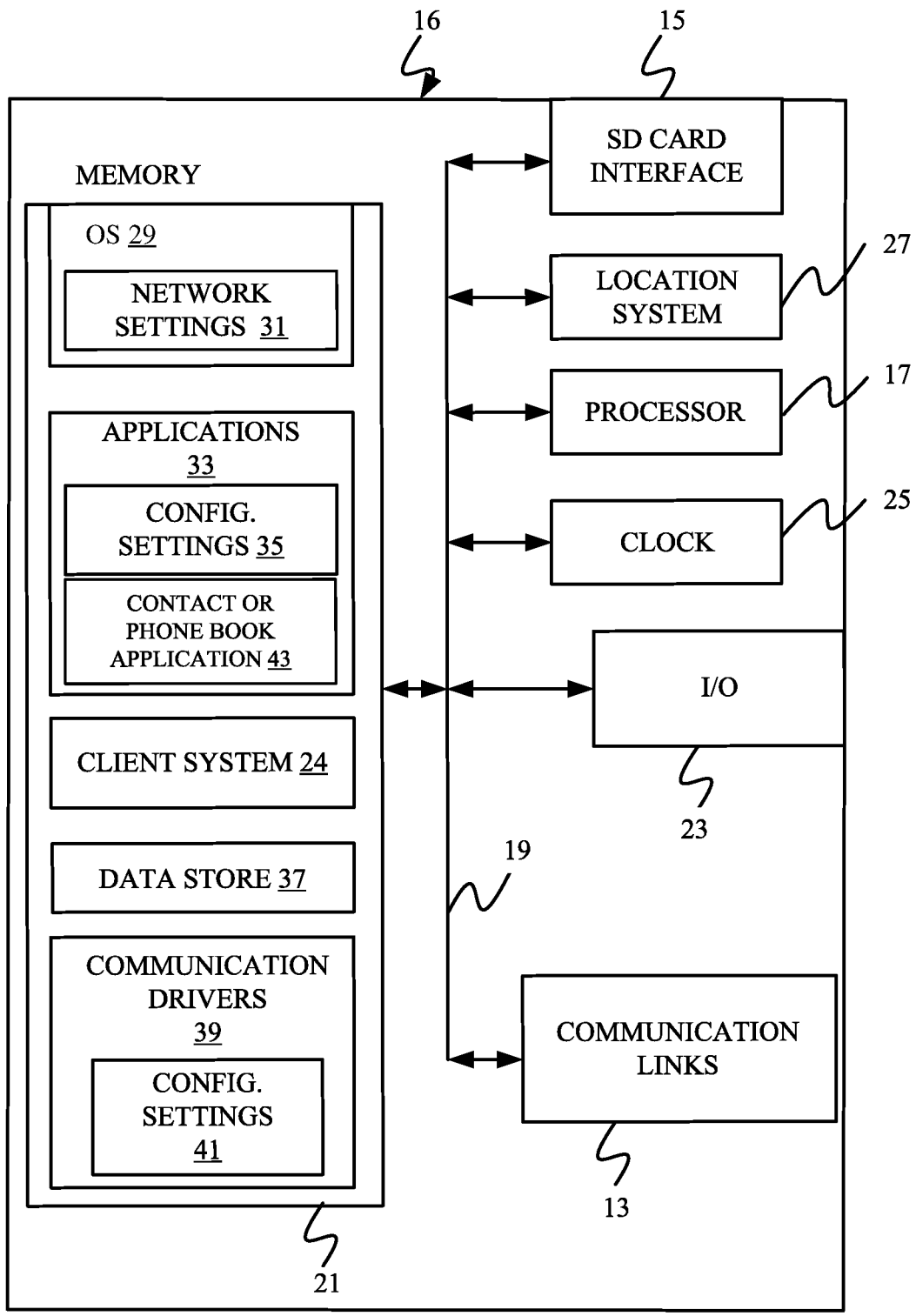
FIGS. 7-9 show examples of mobile devices that can be used in the architectures shown in the previous FIGS.
Figure 8:
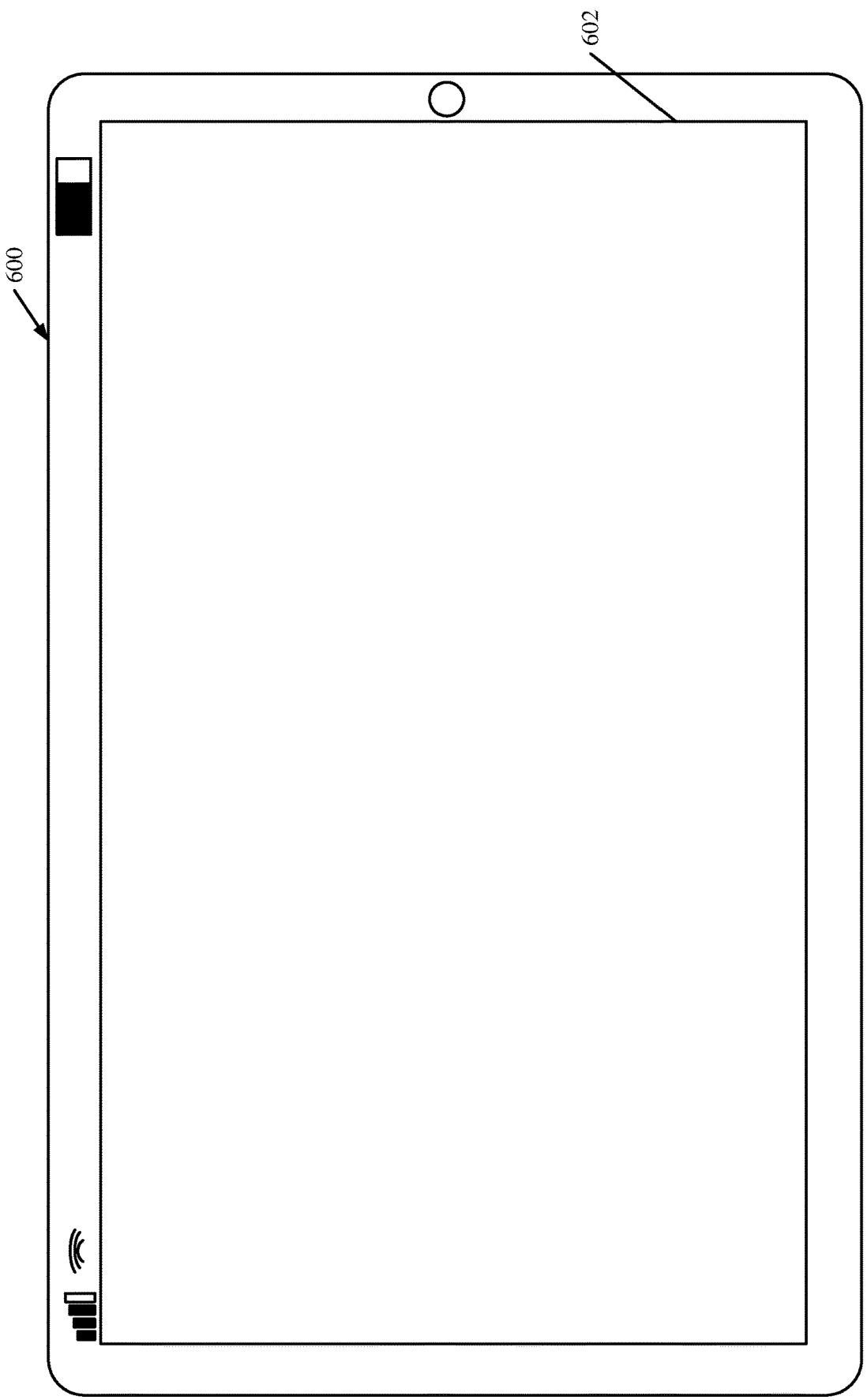
Figure 9:
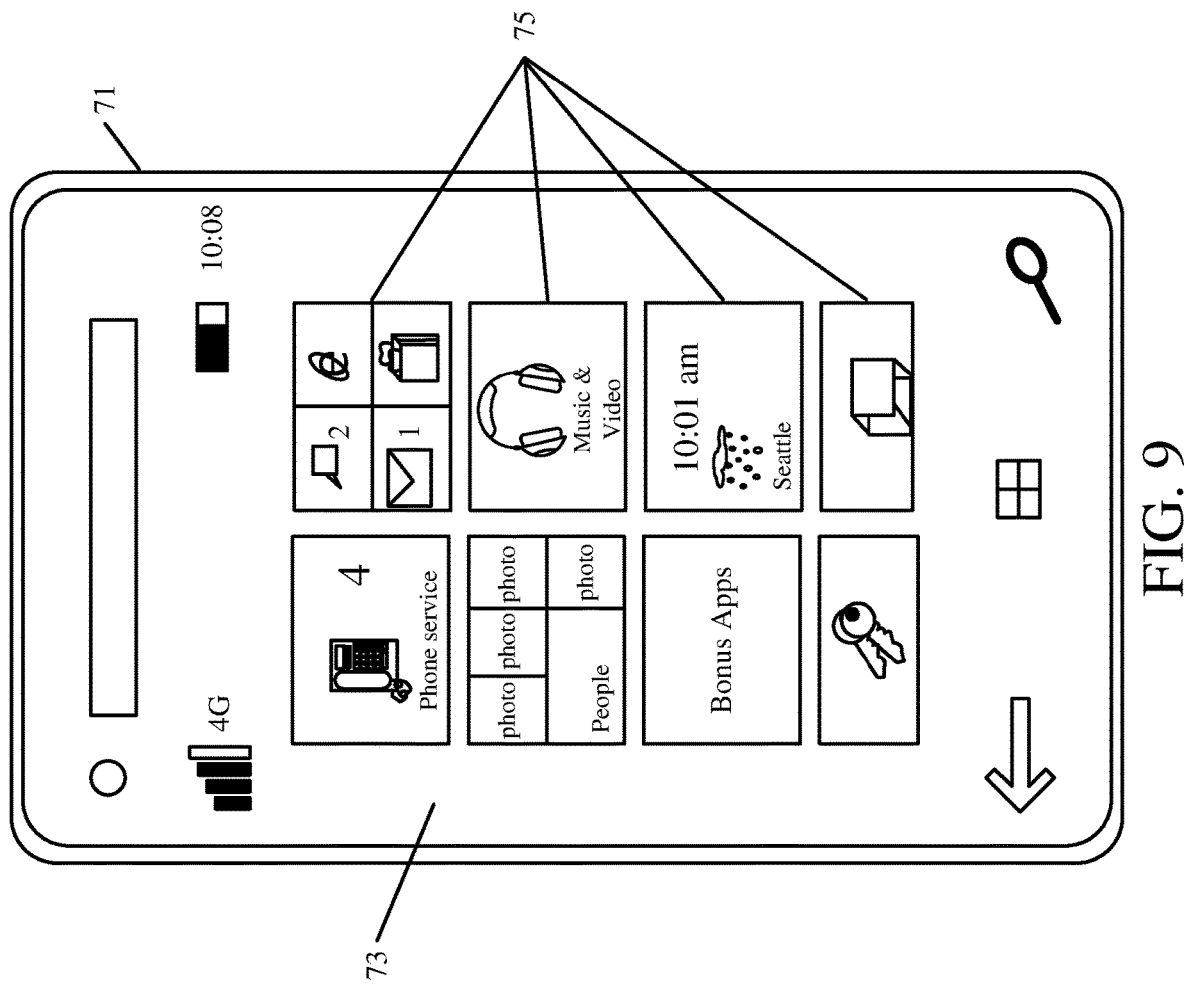

FIG. 7 is a simplified block diagram of one illustrative example of a handheld or mobile computing device that can be used as a user's or client's hand held device 16, in which the present system (or parts of it) can be deployed. For instance, a mobile device can be deployed in the operator compartment of machine 102 or 104 for use in generating, processing, or displaying the images or three-dimensional representation. FIGS. 8-9 are examples of handheld or mobile devices.

FIG. 7 provides a general block diagram of the components of a client device 16 that can run some components shown in FIGS. 1 and 2, that interacts with them, or both. In the device 16, a communications link 13 is provided that allows the handheld device to communicate with other computing devices and under some examples provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers from previous FIGS) along a bus 19 that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 8 shows one example in which device 16 is a tablet computer 600. In FIG. 8, computer 600 is shown with user interface display screen 602. Screen 602 can be a touch screen or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 9 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 10:
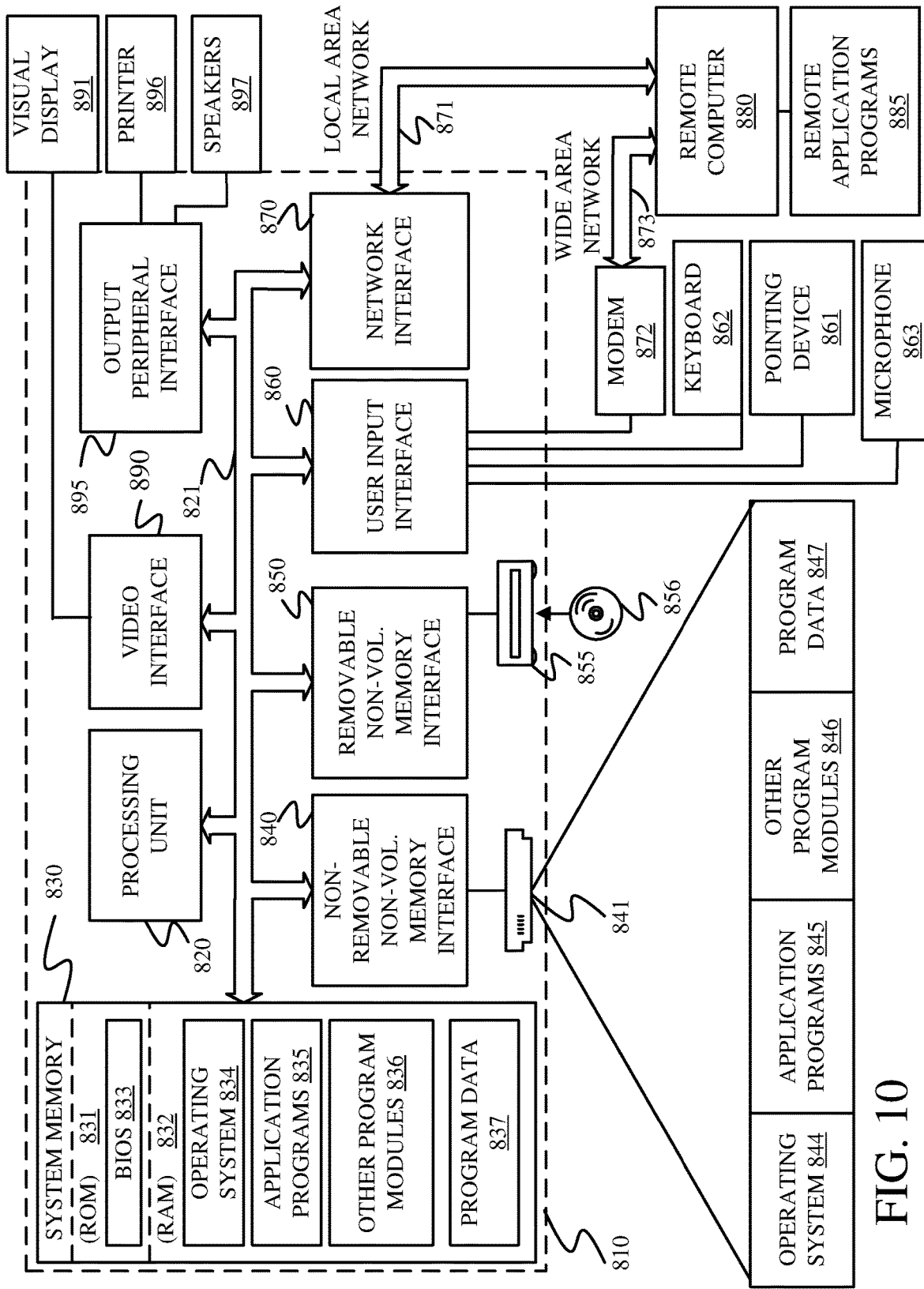
FIG. 10 is a block diagram showing one example of a computing environment that can be used in the architectures shown in the previous FIGS.

FIG. 10 is one example of a computing environment in which elements of FIGS. 1 and 2, or parts of them, (for example) can be deployed. With reference to FIG. 10, an example system for implementing some embodiments includes a general-purpose computing device in the form of a computer 810. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIG. 1 can be deployed in corresponding portions of FIG. 10.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 10 illustrates operating system 834, application programs 835, other program modules 836, and program data 837.

The computer 810 may also include other removable/non-removable volatile/nonvolatile computer storage media. By way of example only, FIG. 10 illustrates a hard disk drive 841 that reads from or writes to non-removable, nonvolatile magnetic media, nonvolatile magnetic disk 852, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 10, provide storage of computer readable instructions, data structures, program modules and other data for the computer 810. In FIG. 10, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a local area network—LAN, a controller area network—CAN or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 10 illustrates, for example, that remote application programs 885 can reside on remote computer 880.

It should also be noted that the different examples described herein can be combined in different ways. That is, parts of one or more examples can be combined with parts of one or more other examples. All of this is contemplated herein.

Example 1 is a work machine computing system, comprising:

an image transmission handling system that receives a first set of images of a first excavation site that is located at a first location;

automatic item identifier logic that recognizes a first set of items in the first excavation site from the first set of images, the items being located below a surface level of ground at the first excavation site by a first subterranean depth;

three-dimensional (3D) generation logic that generates a first 3D representation of the first excavation site from the first set of images, with the recognized first set of items located within the 3D representation at the subterranean depth based on the first set of images;

data store interaction logic that stores the first 3D representation, corresponding to the first location of the first excavation site, in a data store; and a request processing system that receives a request, from a requesting system, identifying a requested location, accesses the data store to obtain the 3D representation corresponding to the requested location and generates a response that includes the 3D representation corresponding to the requested location and sends the response to the requesting system.

Example 2 is the work machine computing system of any or all previous examples wherein the 3D generation logic is configured to identify a pose, in 3D space, of each recognized item based on the first set of images.

Example 3 is the work machine computing system of any or all previous examples wherein the image transmission handling system is configured to receive a second set of images from a second excavation site at a second location and wherein the automatic item identifier logic is configured to recognize a second set of items in the second excavation site from the second set of images, the second set of items being located below a surface level of ground at the second excavation site by a second subterranean depth.

Example 4 is the work machine computing system of any or all previous examples wherein the three-dimensional (3D) generation logic is configured to generate a second 3D representation corresponding to the second excavation site from the second set of images, with the recognized second set of items located within the 3D representation at the second subterranean depth based on the second set of images.

Example 5 is the work machine computing system of any or all previous examples and further comprising:

image correlation logic configured to identify correlations between the first set of items and the second set of items based on the first and second 3D representations.

Example 6 is the work machine computing system of any or all previous examples wherein the 3D generation logic is configured to generate a third 3D representation corresponding to a third location based on the correlations identified between the first set of items and the second set of items.

Example 7 is the work machine computing system of any or all previous examples wherein the 3D generation logic is configured to generate the third 3D representation with recognized items located within the third 3D representation at a third subterranean depth based on the correlations identified between the first set of items and the second set of items.

Example 8 is the work machine computing system of any or all previous examples wherein the image correlation logic is configured to identify the correlations as extrapolations of poses of the recognized items based on the first and second 3D representations.

Example 9 is the work machine computing system of any or all previous examples wherein the automatic item identifier logic comprises a machine learning classification model configured to recognize the items by classifying the items into one of a plurality of predefined classes.

Example 10 is the work machine computing system of any or all previous examples wherein the automatic item identifier logic is configured to identify a material that a recognized item is made from.

Example 11 is the work machine computing system of any or all previous examples wherein the first excavation site includes a first excavation with a sidewall and wherein the automatic item identifier logic is configured to recognize a soil type along a side wall of the excavation.

Example 12 is the work machine computing system of any or all previous examples wherein the 3D generation logic is configured to identify different depth levels, in the 3D space, of each soil type recognized along the sidewall, based on the first set of images.

Example 13 is the work machine computing system of any or all previous examples wherein the request includes a depth identifier and wherein the request processing system comprises:

request parsing logic that parses the request to identify the requested location and the depth identified by the depth identifier; and a response generator configured to generate the response that includes a 3D representation corresponding to the requested location and the depth.

Example 14 is a work machine, comprising:

an excavation implement that excavates soil to generate an excavation;

an image capture device;

a machine orientation sensor that senses an orientation of the work machine and generates an orientation output indicative of the sensed orientation;

capture control logic that detects actuation of the excavation implement and controls the image capture device to take a set of images of the excavation from different perspectives;

metadata generation logic that generates time stamp metadata, location stamp metadata and orientation metadata identifying a time, a location and an image capture device orientation corresponding to the set of images; and a communication system that transmits the set of images and corresponding metadata and orientation output to a remote server.

Example 15 is a computer implemented method of controlling an image processing system, the computer implemented method comprising:

receiving a first set of images of a first excavation site that is located at a first location;

recognizing a first set of items in the first excavation site from the first set of images, the items being located below a surface level of ground at the first excavation site by a first subterranean depth;

generating a first 3D representation of the first excavation site from the first set of images, with the first set of items located within the 3D representation at the subterranean depth based on the first set of images;

storing the first 3D representation, corresponding to the first location of the first excavation site, in a data store;

receiving a request, from a requesting system, identifying a requested location;

accessing the data store to obtain the 3D representation corresponding to the requested location;

generating a response that includes the 3D representation corresponding to the requested location; and sending the response to the requesting system.

Example 16 is the computer implemented method of any or all previous examples wherein generating the first 3D representation comprises identifying a pose, in 3D space, of each recognized item based on the first set of images.

Example 17 is the computer implemented method of any or all previous examples and further comprising:

receiving a second set of images from a second excavation site at a second location; and recognizing a second set of items in the second excavation site from the second set of images, the items being located below a surface level of ground at the second excavation site by a second subterranean depth.

Example 18 is the computer implemented method of any or all previous examples and further comprising:

generating a second 3D representation corresponding to the second excavation site from the second set of images, with the recognized items located within the 3D representation at the second subterranean depth based on the second set of images;

Example 19 is the computer implemented method of any or all previous examples and further comprising:

identifying correlations between the first set of items and the second set of items based on the first and second 3D representations; and generating a third 3D representation corresponding to a third location based on the correlations identified between the first set of items and the second set of items.

Example 20 is the computer implemented method of any or all previous examples wherein generating the third the 3D representation comprises generating the third 3D representation with recognized items located within the third 3D representation at a third subterranean depth based on the correlations identified between the first set of items and the second set of items.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A work machine computing system, comprising:
an image transmission handling system that receives a
first set of images of a first excavation site that is located at a first location and a second set of images from a second excavation site at a second location;

automatic item identifier logic that recognizes a first set of items in the first excavation site from the first set of images, the first set of items being located below a surface level of ground at the first excavation site by a first subterranean depth and a second set of items in the second excavation site from the second set of images, the second set of items being located below a surface level of ground at the second excavation site by a second subterranean depth;

three-dimensional (3D) generation logic that generates a first 3D representation of the first excavation site from the first set of images, with the recognized first set of items located within the first 3D representation at the first subterranean depth based on the first set of images and a second 3D representation of the second excavation site from the second set of images, with the recognized second set of items located within the second 3D representation at the second subterranean depth based on the second set of images;

image correlation logic configured to identify correlations between the first set of items and the second set of items based on the first and second 3D representations, wherein the 3D generation logic generates a third 3D representation corresponding to a third location based on the correlations identified between the first set of items and the second set of items;

data store interaction logic that stores the first, second, and third 3D representation in a data store; and a request processing system that receives a request, from a requesting system, identifying a requested location, accesses the data store to obtain the 3D representation corresponding to the requested location and generates a response that includes the 3D representation corresponding to the requested location and sends the response to the requesting system.

2. The work machine computing system of claim 1 wherein the 3D generation logic is configured to identify a pose, in 3D space, of each recognized item based on the first set of images and the second set of images.

3. The work machine computing system of claim 1 wherein the 3D generation logic is configured to generate the third 3D representation with recognized items located within the third 3D representation at a third subterranean depth based on the correlations identified between the first set of items and the second set of items.

4. The work machine computing system of claim 3 wherein the image correlation logic is configured to identify the correlations as extrapolation of poses of the recognized items based on the first and second 3D representations.

5. The work machine computing system of claim 2 wherein the automatic item identifier logic comprises a machine learning classification model configured to recognize the items by classifying the items into one of a plurality of predefined classes.

6. The work machine computing system of claim 2 wherein the automatic item identifier logic is configured to identify a material that a recognized item is made from.

7. The work machine computing system of claim 2 wherein the first excavation site includes a first excavation with a sidewall and wherein the automatic item identifier logic is configured to recognize a soil type along a side wall of the excavation.

8. The work machine computing system of claim 7 wherein the 3D generation logic is configured to identify different depth levels, in the 3D space, of each soil type recognized along the sidewall, based on the first set of images.

9. The work machine computing system of claim 2 wherein the request includes a depth identifier and wherein the request processing system comprises:

request parsing logic that parses the request to identify the requested location and the depth identified by the depth identifier; and a response generator configured to generate the response that includes a 3D representation corresponding to the requested location and the depth.

10. A computer in method of controlling, an image processing system, the computer implemented method comprising:

receiving a first set of images of a first excavation site that is located at a first location;

receiving a second set of images of a second excavation site that is located at a second location;

recognizing a first set of items in the first excavation site from the first set of images, the items being located below a surface level of ground at the first excavation site by a first subterranean depth;

recognizing a second set of items in the second excavation site from the second set of images, the items being located below a surface level of ground at the second excavation site by a second subterranean depth;

generating a first 3D representation of the first excavation site from the first set of images, with the recognized first set of items located within the first 3D representation at the first subterranean depth based on the first set of images;

generating a second 3D representation of the second excavation site from the second set of images, with the recognized second set of items located within the second 3D representation at the second subterranean depth based on the second set of images;

identifying correlations between the first set of items and the second set of items based on the first and second 3D representations;

generating a third 3D representation corresponding to a third location based on the correlations identified between the first set of items and the second set of items;

storing the first, second, and third 3D representations in a data store;

receiving a request, from a requesting system, identifying a requested location;

accessing the data store to obtain the 3D representation corresponding to the requested location;

generating a response that includes the 3D representation corresponding to the requested location; and sending the response to the requesting system.

11. The computer implemented method of claim 10 wherein generating the first 3D representation comprises identifying a pose, in 3D space, of each recognized item based on the first set of images.

12. The computer implemented method of claim 10 wherein generating the third the 3D representation comprises generating the third 3D representation with recognized items located within the third 3D representation at a third subterranean depth based on the correlations identified between the first set of items and the second set of items.

* * * * *